March 5, 1957   P. D. BERMINGHAM   2,784,017
FACE TO FACE SEAL
Filed Jan. 19, 1952

PETER D. BERMINGHAM
INVENTOR
By L. William Freeman
ATTORNEY

United States Patent Office 2,784,017
Patented Mar. 5, 1957

2,784,017
FACE TO FACE SEAL

Peter D. Bermingham, Suffield, Ohio, assignor of ten percent to J. William Freeman and five percent to Robert V. Maher, Akron, Ohio Application January 19, 1952, Serial No. 267,258

5 Claims. (Cl. 288—3)

This invention relates to sealing devices and in particular relates to face type seals used to effectuate a leak-proof contact between relatively movable parts.

Originally, initial attempts at effectuating a seal between a rotating shaft and a surrounding stationary member, were directed toward the use of packing material inserted in the slight space provided between the respective members. In addition to possessing a relatively short life span, this form of seal had the further disadvantage of not being able to withstand any appreciable degree of pressure.

Accordingly, the next efforts were directed towards the use of "wiper type" seals which essentially comprised a resilient member fixed on the stationary surface and designed to have frictional contact with the revolving shaft. The principal disadvantage of this type of seal was found in the wear caused on the rotating shaft. Specifically, it was found that a definite groove would be worn in the shaft notwithstanding the fact that the material of the wiper element was made of resilient material.

Recently developed seals of this type, in attempting to obviate the aforementioned difficulties, have reverted to a different principle of sealing wherein the seal is effectuated between relatively movable sealing faces held in sealing engagement with each other by various devices. At first this sealing engagement was maintained by spring devices operable between the housing and stationary sealing face fixedly positioned with respect thereto. The disadvantage of this form of seal arose from the fact that the same could not withstand the turning force incidental to this type of operation. As a consequence of this defect, the spring mechanism is invariably broken and a destruction of the sealing function occurs.

To avoid the costly breakdown of springing mechanism first referred to, certain recent developments have been directed towards the utilization of a pressure differential as an auxiliary help in maintaining the requisite pressure on the stationary face necessary to maintain the same in sealing engagement with the relatively movable sealing face. While the complexity of the device employed to utilize this principle of auxiliary pressure by virtue of pressure differential makes the cost relatively high in comparison to ordinary spring-actuated mechanisms, the largest single disadvantage lies in the limited field in which the device can be used. Because the pressure differential principle employed requires pressure of both sides of the sealing face, it is manifest that this device could not be used, as a practical matter, where one surface of a sealing face is exposed to the atmosphere.

Accordingly, it is one object of this invention to provide a face type of fluid seal the operability of which is not dependent on a spring-actuated mechanism.

It is a further object of this invention to provide a face type of fluid seal, the operability of which is not dependent on a pressure differential.

It is a further object of this invention to provide a self-contained, face type of fluid seal which can be employed in installations where at least one surface of the sealing faces is exposed to the atmosphere.

It is a further object of this invention to provide a face type of fluid seal provided with auxiliary sealing action at independent points.

It is a further object of this invention to provide a face type of fluid seal having a minimum number of parts and being of low initial and replacement cost.

It is a further object of this invention to provide a face type of fluid seal wherein misalignment of the rotating member with respect to the stationary surface will not affect operation of the sealing unit.

It is a further object of this invention to provide a face type of fluid seal having the degree of sealing pressure dependent upon the operating pressure.

It is a still further object of this invention to provide a face type of fluid seal which is not affected by the turning force created between the sealing faces thereof.

These and other objects of the invention will become more apparent upon consideration of the following specification in the light of the accompanying drawings.

Figure 1:
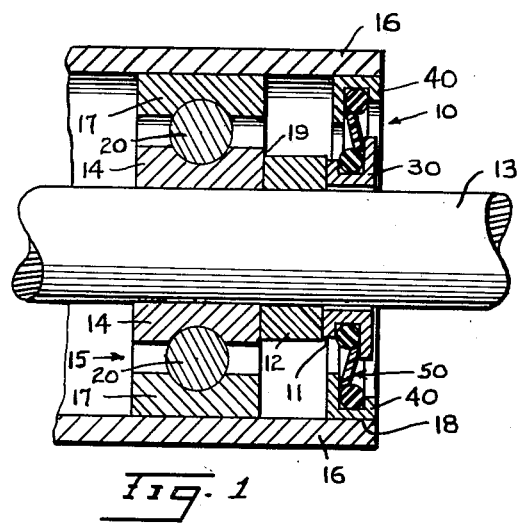
Figure 1 is a side elevation, partly broken away and in section, showing an installation incorporating the use of the improved sealing device under normal operating conditions.

Referring now to the drawings, and in particular to Figure 1 thereof, one face 33 of a sealing unit 10 is shown engaged in sealing relationship with a registering sealing face 11 of a mating ring 12 that is fixed with respect to a shaft 13 and the inner race 14 of a ball bearing assembly unit 15, while a surrounding housing 16, aligned with shaft 13, receives the outer race 17 of the ball-bearing assembly unit 15 and the peripheral portion 18 of the sealing unit 10, in non-movable, press-fit relationship.

Because the construction of the ball-bearing assembly unit 15 does not directly affect the operation of the sealing unit 10, it is manifest that any one of several standard types of ball bearing assemblies could be used in the installation shown in Figure 1 without materially affecting the operation of the same. Accordingly, the standard ball-bearing assembly unit 15 shown in Figure 1 comprises a plurality of hardened steel balls 20, 20, receivable within inner and outer raceway members 14 and 17 which are fixedly positioned with respect to the shaft 13 and housing 16 respectively. While the installation set forth in Figure 1 includes use of a mating ring 12 having a lapped sealing face 11, it is manifest that this mating ring could be omitted if the face 19 of the inner raceway member 14 was lapped and positioned in sealing relationship with the sealing face 33 of the sealing unit 10.

Figures 2, 3:
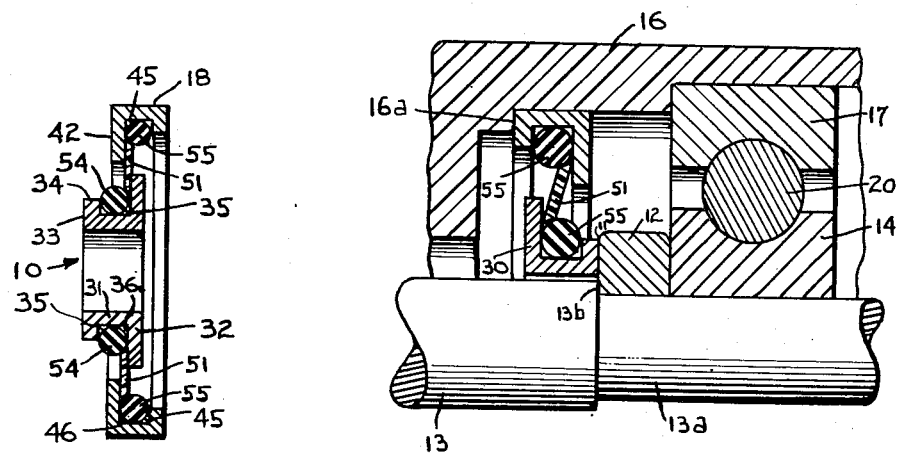
Figure 2 is a side view, partly broken away and in section, and showing the sealing unit per se.
Figure 3 is a side elevation, partly broken away and in section and illustrating how the device can be adapted to a different type of installation.

With respect to the sealing unit per se, which has generally been designated as 10, the same is shown in Figure 2 as including male and female sealing members 30 and 40, respectively, with the sealing face 33 of the male member 30 being movable with respect to the female member 40 by use of tensioning means 50 to be described.

To this end, the male sealing element 30 comprises a tubular disc member 31 receivable loosely over the shaft 13 and provided with an annular flange 32 extending from one end thereof and having the opposite free end thereof defining a lapped sealing face 33 for sealing engagement with the sealing face 11 of the mating ring 12. For receiving the tensioning means 50 the exteriorly presented peripheral surface 34 thereof is provided with an annular groove 35 therein, one sidewall 36 thereof being defined by the flange 32.

Similarly, the female sealing member 40 comprises a tubular disc member having the peripheral portion 18 thereof receivable within the housing 16 in press-fit relationship, and having one free end thereof provided with an annular flange 42. In similar manner to the male member 30, the tensioning means 50 are received within an annular groove 45, one sidewall 46 of which is defined by the flange 42.

Figure 6:
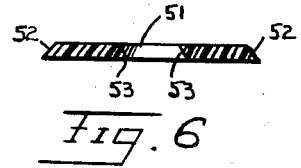
Figure 6 is a cross sectional view of the sealing plate used in the improved sealing unit.

Considering next the tensioning means 50, the same comprises an apertured sealing plate 51 having the outer and inner peripheral edge portions thereof beveled as at 52 and 53 and being receivable within grooves 35 and 45 of the male and female sealing members 30 and 40 respectively (see Figure 6).

In like manner, annular rings 54 and 55 of resilient material, are received within the grooves 35 and 45 respectively, the arrangement being such that a wedging action takes place in the male member 30 between the beveled edge 53, the sidewall 36 and ring 54. A similar wedging action takes place in the female member 40 between the beveled edge 52, the sidewall 46, and the ring 55 (see Fig. 2).

In use or operation of the improved sealing device for effectuating a fluid-tight connection between a rotating shaft 13 and a stationary surface 16 aligned therewith, the same must first be assembled into a unit as shown in Figure 2, by positioning the beveled edge portion 52 of the sealing plate 51 against the sidewall 46 of the female member 40. At this point, the annular ring 55 may be fixed within the groove 45 with the result that the peripheral edge 52 will be wedged between the sidewall 46 and the ring 55. With the partially-assembled unit in this condition, the female member 30 may be guided through the aperture of the plate 51 until the flange 32 thereof engages the beveled portion 53 of the same. Positioning of the ring 54 in the groove 35 will then complete assembly of the unit.

In positioning the assembled unit within the installation shown in Figure 1, the unit may be placed around the shaft 13 and urged to the left (Figure 1) until the sealing face 33 engages the sealing face 11 of the previously positioned mating ring 12. Maintaining of this sealing engagement is then provided for by forcing the female sealing unit 40 further to the left in the housing 16 until the same is in the position shown in Figure 1.

In operation, the device shown in Figure 1 is dependent upon the inherent resiliency of the plate 51 and the action of the beveled edge portions 52 and 53 within the grooves 35 and 45, respectively. The inherent resiliency is important because it causes a continual urging of the sealing face 33 against the sealing face 11. The wedging action taking place in grooves 35 and 45 is important because it permits a certain degree of misalignment and also because it causes a seal, the effectiveness of which is directly proportional to the pressure exerted. The rolling action of the rings 54 and 55 gives flexibility while the resiliency thereof serves as an auxiliary urging force always seeking to return the member 30 to the position of Figure 2.

It will be seen from the foregoing that a new and novel approach has been made in the art of face to face sealing, wherein, by virtue of larger contact areas being held stationary, the turning force between the sealing faces is not operable to effectuate a turning action.

It seems manifest that a varied number of modifications may be resorted to under the above principles. For example, the grooves 35 and 45 could be widened so as to accommodate two or more O-rings in each groove with the beveled edges 52 and 53 receivable between these rings in wedging relationship.

Similarly, it is also manifest that the sealing plate 51 could be equipped with projections receivable within cooperating recesses provided on the side wall 46 of the female member 40. In this manner any rotation of the plate 51 with respect to the female member 40 would be obviated.

By like token, in Figure 3, the adaptability of the sealing unit 10 to various installations is illustrated. In this type of installation, generally referred to as a "closed seal," the ball bearing assembly 15 and the mating ring 12 are press-fit onto a reduced portion 13a of the shaft 13, and a portion of the sealing face 11 abuts the shoulder 13b of the shaft 13. Lateral movement of the female member 40 within the housing 16 is prohibited by abutment of the same against a shoulder 16a thereof.

Figure 4:
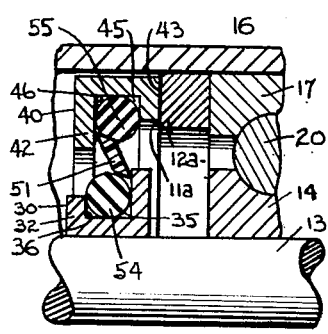
Figure 4 illustrates a modified form of the invention wherein sealing engagement is made with a sealing face fixed with respect to a revolving housing.

In the modified form of the invention shown in Figure 4, the elements of the sealing unit 10 are identical with those shown in Figures 1 and 2 with the exception that the female sealing member 40 is provided with a sealing face 43 for sealing engagement with a sealing face 11a of a mating ring 12a, which is received in press-fit relationship within the housing 16. Accordingly, in this form of the invention, wherein the female member 30 is press-fit to the shaft 13 and the revolving female member 40 is provided with a sealing face 43 engageable with the relatively stationary sealing face 11a of a mating ring 12a, like numbers designate like parts.

Figure 5:
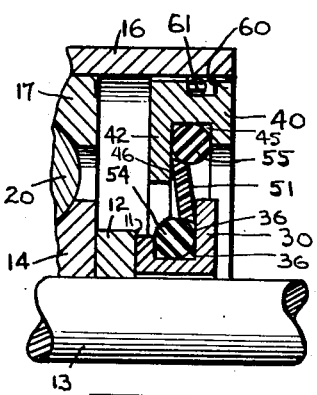
Figure 5 illustrates a modified form of the invention for use in installations where a press-fit between the housing and the sealing unit is not desirable.

The modified form of the invention shown in Figure 5 is designed for use in installations wherein a press-fit is objectionable for one reason or another. To this end the peripheral surface 18 of the female sealing member is provided with an annular groove 60 for reception therein of an annular ring 61 of resilient material and commonly referred to as an O-ring. In this manner, sealing between the surface 18 and the housing 16 is maintained by the ring 61 in known manner. It is also manifest that this modification could be applied to Figure 4, by merely providing the interiorly-presented surface of the male sealing disc 31 with a groove and an annular ring of resilient material.

Other modifications may be resorted to without deviating from the spirit thereof or the scope of the appended claims.

What is claimed is:

1. A sealing unit of the character described, comprising; a pair of sealing elements concentrically telescoped with respect to each other with one said sealing element having an annular groove including a side wall and bottom wall provided in a radially outwardly directed surface thereof, while the other said sealing element has an annular groove including a side and bottom wall provided on a radially inwardly directed surface thereof, with said grooves being capable of being radially aligned with each other upon telescoping of said sealing elements; a resilient O-ring positioned in each said groove in abutment with each side and bottom wall thereof; and an apertured sealing plate having outer and inner perimetrical edge portions thereof respectively engaged against each said O-ring at its point of contact with the said side wall respectively, whereby the contact between said side wall and said O-ring in each groove tensionally spaces said perimetrical edge portion received therein in radially shiftable relationship with respect to said bottom wall of each said groove.

2. A mechanical seal of the character described, comprising; an outer sealing element having an internal radial groove defining a side wall and a bottom wall; an inner sealing element having an external radial groove defining a side and bottom wall; a pair of flexible elements positioned in said grooves in abutment with said side and bottom walls thereof; and an apertured plate positioned between said outer and inner sealing elements, and having the respective outer and inner peripheral edge portions thereof engageable against each of said respective side walls at its point of contact with said flexible element positioned therein, whereby said point of contact between each of said flexible elements and each of said side walls tensionally spaces said outer and inner peripheral edge portions of said plate in radially shiftable relationship with respect to said bottom walls of said grooves in said outer and inner sealing elements.

3. The seal of claim 2 further characterized by the fact that said flexible elements are annular O-rings.

4. The device of claim 2 further characterized by the fact that at least one peripheral edge of said apertured plate is beveled.

5. The device of claim 2, further characterized by the fact that one said sealing element has a sealing face defined by a radial end wall thereof.

References Cited in the file of this patent

UNITED STATES PATENTS

| | | |
|---|---|---|
| 1,891,706 | De Ram | Dec. 20, 1932 |
| 1,972,565 | Kempton | Sept. 4, 1934 |
| 2,023,898 | Olson | Dec. 10, 1935 |
| 2,167,669 | Molyneux | Aug. 1, 1939 |
| 2,526,590 | Summers | Oct. 17, 1950 |
| 2,584,679 | Dobrosavljevic | Feb. 5, 1952 |
| 2,600,433 | Saywell | June 17, 1952 |

FOREIGN PATENTS

| | | |
|---|---|---|
| 584,264 | Great Britain | of 1947 |
| 588,471 | Great Britain | of 1947 |